US012577909B2

(12) United States Patent
O Brien et al.

(10) Patent No.: US 12,577,909 B2
(45) Date of Patent: Mar. 17, 2026

(54) RADIAL INLET COMPRESSOR

(71) Applicant: Pratt & Whitney Canada Corp.,
Longueuil (CA)

(72) Inventors: James O Brien, Hamilton (CA); **Mark
Cunningham**, Montreal-Ouest (CA);
Guorong Yan, Montreal-Ouest (CA)

(73) Assignee: **PRATT & WHITNEY CANADA
CORP.**, Longueuil (CA)

( * ) Notice: Subject to any disclaimer, the term of this
patent is extended or adjusted under 35
U.S.C. 154(b) by 0 days.

(21) Appl. No.: 18/815,308

(22) Filed: Aug. 26, 2024

(65) Prior Publication Data

US 2026/0055728 A1     Feb. 26, 2026

(51) Int. Cl.
F02C 7/04         (2006.01)
F02C 3/08         (2006.01)
F04D 29/42        (2006.01)

(52) U.S. Cl.
CPC .................. F02C 7/04 (2013.01); F02C 3/08
(2013.01); F04D 29/4213 (2013.01)

(58) Field of Classification Search
CPC .... F02C 7/04; F02C 3/08; F02C 7/042; F04D
29/4213; F04D 29/42; F04D 29/44; F04D
29/54; F04D 29/66
See application file for complete search history.

(56) References Cited

U.S. PATENT DOCUMENTS 2,912,156 A    11/1959  Gentile
3,421,446 A     1/1969  Strscheletzly et al.

4,540,338 A  *  9/1985  Pukkila ............... F04D 29/4213
                                                    415/185
6,134,874 A    10/2000  Stoten
6,698,180 B2    3/2004  Snyder
6,959,552 B2   11/2005  Leblanc
(Continued)

FOREIGN PATENT DOCUMENTS

CN      110080999 A    8/2019
DE         869779 C    3/1953
EP        3936710 B1   4/2023

OTHER PUBLICATIONS

Search Report issued in European Patent Application No. 25196538.
0; Date of Mailing Jan. 29, 2026 (8 pages).

*Primary Examiner* — Nathaniel E Wiehe
*Assistant Examiner* — Theodore C Ribadeneyra
(74) *Attorney, Agent, or Firm* — CANTOR COLBURN
LLP

(57)                ABSTRACT

A radial inlet body of a gas turbine engine compressor is
provided. The radial inlet body includes plenums arranged
around opposite sides of an inlet portion defining a com-
pressor inlet. The plenums include outer surfaces with
increasing radii of curvature and a flow diverter. The flow
diverter is disposed aside the inlet portion opposite a duct.
The plenums are configured to direct flows from the duct
around the inlet portion. The flow diverter and the plenums
are configured to cooperatively encourage uniform distribu-
tion of the flows. The flow diverter includes curvilinear sides
that tangentially register with and smoothly lead to the outer
surfaces of the plenums and a cusp where the curvilinear
sides meet. The radial inlet body further includes a front
sidewall supporting the inlet portion and an aft sidewall
opposite the front sidewall. The front and aft sidewalls are
angled toward one another along the plenums.

20 Claims, 5 Drawing Sheets

(56)                    References Cited

U.S. PATENT DOCUMENTS

| | | | |
|---|---|---|---|
| 7,137,240 B2 | 11/2006 | Thompson | |
| 7,559,742 B2 | 7/2009 | Inoue et al. | |
| 7,625,173 B2 | 12/2009 | Mehring | |
| 8,099,943 B2 | 1/2012 | Farber | |
| 9,217,369 B2 | 12/2015 | Rodriguez et al. | |
| 9,835,161 B2 * | 12/2017 | Masutani | F04D 17/122 |
| 10,514,003 B2 | 12/2019 | Akcayoz et al. | |
| 11,808,207 B1 | 11/2023 | Akcayoz | |
| 11,919,654 B2 | 3/2024 | Akcayoz | |
| 2010/0172753 A1 * | 7/2010 | Lin | F04D 29/441 |
| | | | 415/208.1 |
| 2013/0243586 A1 * | 9/2013 | Rodriguez | F04D 29/4213 |
| | | | 415/208.1 |
| 2018/0291923 A1 | 10/2018 | Sezal et al. | |

* cited by examiner

RADIAL INLET COMPRESSOR

BACKGROUND

Exemplary embodiments of the present disclosure relate generally to radial inlet compressors and, in some embodiments, to a cusp-shaped plenum for a radial inlet compressor of a gas turbine engine.

A turboprop or turboshaft is a turbine engine that drives an aircraft propeller or a helicopter rotor and includes an intake, a reduction gearbox, a compressor, a combustor, a turbine and a propelling nozzle (the following description will generally refer to a turboprop application, such as an aircraft propeller or a propeller, for clarity and brevity). Air enters the intake and is compressed by the compressor. Fuel is then added to the compressed air and the fuel-air mixture combusts in the combustor to produce hot combustion gases. The hot combustion gases expand through the turbine, generating power at the point of exhaust. Some of the power generated by the turbine is used to drive the compressor and an electric generator. The gases are then exhausted from the turbine. In contrast to a turbojet or turbofan, the engine's exhaust gases do not provide enough power to create significant thrust, since almost all of the engine's power is used to drive the propeller.

A continuing need exists for improvements in turboprop or turboshaft aero engines.

BRIEF DESCRIPTION

According to an aspect of the disclosure, a radial inlet body of a gas turbine engine compressor is provided. The radial inlet body includes plenums arranged around opposite sides of an inlet portion defining a compressor inlet. The plenums include outer surfaces with increasing radii of curvature and a flow diverter. The flow diverter is disposed aside the inlet portion opposite a duct. The plenums are configured to direct flows from the duct around the inlet portion. The flow diverter and the plenums are configured to cooperatively encourage uniform distribution of the flows. The flow diverter includes curvilinear sides that tangentially register with and smoothly lead to the outer surfaces of the plenums and a cusp where the curvilinear sides meet. The radial inlet body further includes a front sidewall supporting the inlet portion and an aft sidewall opposite the front sidewall. The front and aft sidewalls are angled toward one another along the plenums.

In accordance with additional or alternative embodiments, the outer surfaces are parabolic.

In accordance with additional or alternative embodiments, the plenums include the outer surfaces with the increasing radii of curvature from a midpoint of the inlet portion to the flow diverter.

In accordance with additional or alternative embodiments, the flow diverter is aligned with a center line of the duct and the plenums and the flow diverter are symmetric about the center line.

In accordance with additional or alternative embodiments, the flow diverter is offset from a center line of the duct and the plenums and the flow diverter are asymmetric.

In accordance with additional or alternative embodiments, the aft sidewall is entirely flat and the front sidewall includes an angled portion which is angled toward the aft sidewall.

In accordance with additional or alternative embodiments, the front and aft sidewalls each include an angled portion angled toward the opposite angled portion.

According to an aspect of the disclosure, a radial inlet of a gas turbine engine compressor is provided. The radial inlet includes an inlet portion defining a compressor inlet, a duct and a body. The body includes plenums arranged around opposite sides of the inlet portion. The plenums include outer surfaces with increasing radii of curvature and a flow diverter disposed aside the inlet portion opposite the duct. The plenums are configured to direct flows from the duct around the inlet portion. The flow diverter and the plenums are configured to cooperatively encourage uniform distribution of the flows. The flow diverter includes curvilinear sides that tangentially register with and smoothly lead to the outer surfaces of the plenums and a cusp where the curvilinear sides meet. The radial inlet further includes a front sidewall supporting the inlet portion and an aft sidewall opposite the front sidewall. The front and aft sidewalls are angled toward one another along the plenums.

In accordance with additional or alternative embodiments, the outer surfaces are parabolic.

In accordance with additional or alternative embodiments, the plenums include the outer surfaces with the increasing radii of curvature from a midpoint of the inlet portion to the flow diverter.

In accordance with additional or alternative embodiments, the flow diverter is aligned with a center line of the duct and the plenums and the flow diverter are symmetric about the center line.

In accordance with additional or alternative embodiments, the flow diverter is offset from a center line of the duct and the plenums and the flow diverter are asymmetric.

In accordance with additional or alternative embodiments, the aft sidewall is entirely flat and the front sidewall includes an angled portion which is angled toward the aft sidewall.

In accordance with additional or alternative embodiments, the front and aft sidewalls each include an angled portion angled toward the opposite angled portion.

According to an aspect of the disclosure, a radial inlet of a gas turbine engine compressor is provided. The radial inlet includes an inlet portion defining a compressor inlet leading to a compressor section, a duct by which air is directed from an exterior toward the inlet portion and a body. The body includes plenums arranged around opposite sides of the inlet portion. The plenums include outer surfaces with increasing radii of curvature and a flow diverter disposed aside the inlet portion opposite the duct. The plenums are configured to direct flows from the duct around the inlet portion. The flow diverter and the plenums are configured to cooperatively encourage uniform distribution of the flows. The flow diverter includes curvilinear sides that tangentially register with and smoothly lead to the outer surfaces of the plenums and a cusp where the curvilinear sides meet. The radial inlet further includes a front sidewall supporting the inlet portion and an aft sidewall opposite the front sidewall. The front and aft sidewalls are angled toward one another along the plenums.

In accordance with additional or alternative embodiments, the outer surfaces are parabolic.

In accordance with additional or alternative embodiments, the plenums include the outer surfaces with the increasing radii of curvature from a midpoint of the inlet portion to the flow diverter.

In accordance with additional or alternative embodiments, the flow diverter is aligned with a center line of the duct and the plenums and the flow diverter are symmetric about the center line.

In accordance with additional or alternative embodiments, the flow diverter is offset from a center line of the duct and the plenums and the flow diverter are asymmetric.

In accordance with additional or alternative embodiments, at least one of the aft sidewall is entirely flat and the front sidewall includes an angled portion which is angled toward the aft sidewall and the front and aft sidewalls each include an angled portion angled toward the opposite angled portion.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

Figure 1:
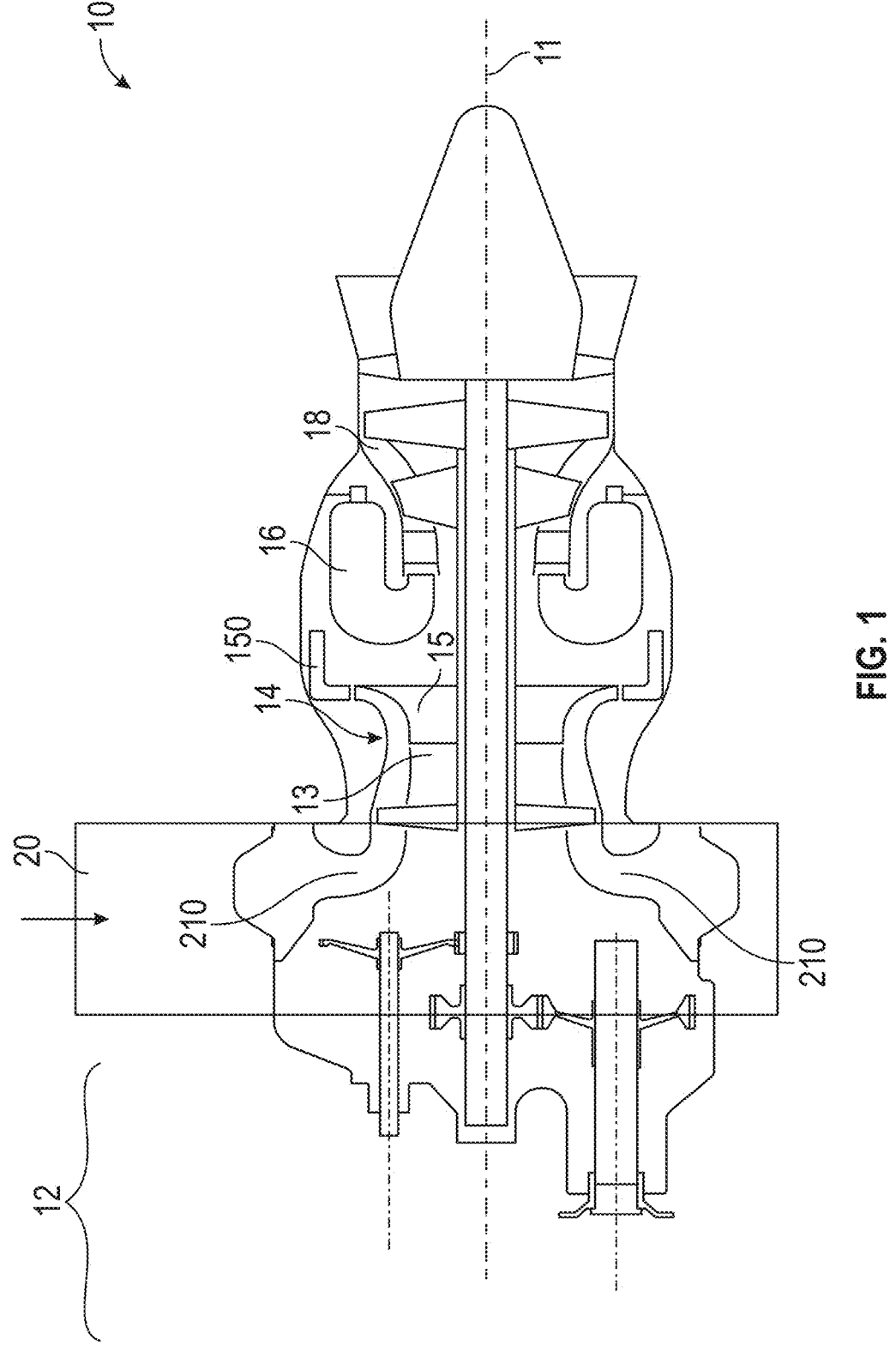
FIG. 1 is a schematic cross-sectional view of an aircraft gas turbine engine in accordance with embodiments.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

For turboprop or turboshaft aero engine applications as well as auxiliary power unit applications, an air inlet duct feeds a compressor portion. The air inlet duct delivers air to a large inlet plenum or manifold that is annulus-shaped and surrounds the compressor inlet. In some cases, two or more ducts feed the plenum to provide uniform air flow into the compressor. In many situations, only one inlet duct provides air to one side of the plenum due to a lack of space. As such, as air enters the plenum, the flow of air is split into two flows along two paths with each path being routed around the plenum before being fed to the compressor inlet. On the plenum back wall (i.e., opposite of the inlet duct), the two flows of air meet. At this point, in order to prevent the two flows of air from clashing and causing turbulence, noise and losses there is often a flow deflector. The flow deflector can be a splitter plate or a V-shaped ramp (i.e., a ski jump-shape) to direct the two flow paths away from one another and into the compressor inlet. Naturally, the sector of the compressor that is closer to the inlet duct will receive more air while the opposite side receives less. This uneven inlet flow profile results in a less efficient compressor.

Accordingly, a continuing need exists for improvements in the air inlet duct that feeds a compressor portion of a turboprop or turboshaft aero engine that can lead to improved and less uneven inlet flow profiles and thus a more efficient compressor.

As will be described below, to achieve a more uniform inlet pressure profile and reduce losses, a flow deflector of a radial inlet is configured in a gradual and tangential manner with respect to an outer curve of a plenum. In addition, in order to address flow biases and to avoid instances in which the plenum has a lower pressure profile than the side closest to the inlet opening due to reduced plenum radii caused by modifications to the deflector that restrict air flows and cause high flow incidence, radii of the plenum are increased to ensure smooth flow entry into the compressor. The increased radii can be achieved by modifying the plenum to have two individual parabola-shaped arcs. In the center, where the two arcs/air flows meet, instead of a V-shaped ramp to redirect the air flows, two tangential curves forming a cusp will be utilized. The combination of a plenum radius at the far side of the plenum and continuous and smooth curves will promote more air flow to the far side creating a more even inlet pressure profile. Also, while the cusp-shape serves to radially open the cross-section and helps direct the air flows more efficiently, the plenum contracts and tapers in the same direction as the air flows to maintain desired flow rates. The wall taper and cusp designs are linked such that the area of the radial inlet cuts of the plenum result in approximately a constant flow velocity in the plenum.

FIG. 1 illustrates a gas turbine engine 10 of a type preferably provided for use in subsonic flight of an aircraft (i.e., a turboprop or turboshaft aero engine). The gas turbine engine 10 generally includes in serial flow communication a propeller section 12 through which ambient air is propelled, a compressor 14 for pressurizing the air having an axial compressor 13 and a centrifugal compressor 15, a diffuser bore 150, a combustor 16, a turbine section 18 and an air inlet duct 20 that draws in air to feed the compressor 14. The diffuser bore 150 is downstream from the centrifugal compressor 15 and directs compressed air from the centrifugal compressor 15 to the combustor 16. The compressed air is mixed with fuel and ignited in the combustor 16 for generating an annular stream of hot combustion gases. The turbine section 18 is configured to extract energy from the combustion gases. This energy is used to drive rotations of the propeller section 12 and the compressor 14 about center axis 11.

With continued reference to FIG. 1 and with additional reference to FIGS. 2A and 2B, FIGS. 3A, 3B and 3C and FIGS. 4 and 5, a radial inlet assembly 201 of a compressor of a gas turbine engine, such as the compressor 14 of the gas turbine engine 10 of FIG. 1, is provided. The radial inlet assembly 201 includes an inlet portion 210, which includes struts 2101 and which is formed to define an annular compressor inlet 215 (see FIGS. 4 and 5) leading to a compressor section (i.e., the compressor 14 of FIG. 1), a duct 220 (i.e., the air inlet duct 20 of FIG. 1) by which air is directed from an exterior toward the inlet portion 210 and a body 230. The body 230 includes first (i.e., left) plenum 241 and second (i.e., right) plenum 242, a flow diverter 250, a front sidewall 261 (see FIGS. 4 and 5) and an aft sidewall 262 (see FIGS. 4 and 5).

Figure 3A:
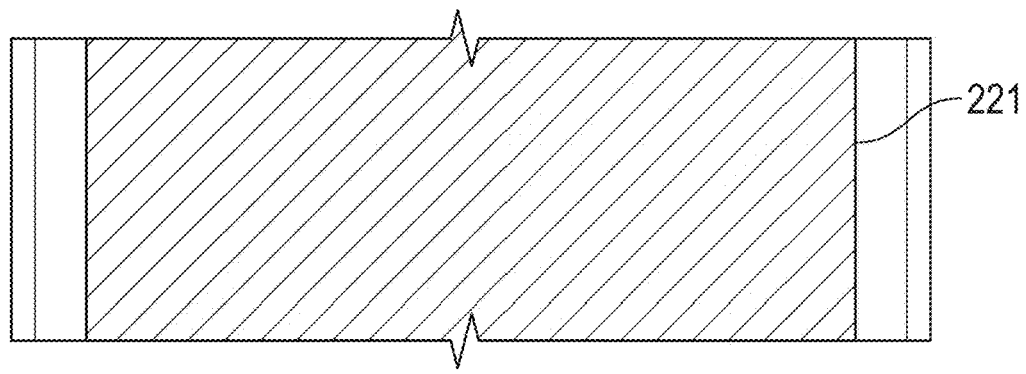
FIGS. 3A, 3B and 3C are cross-sectional views of a duct of the radial inlet of FIGS. 2A and 2B taken along line 3-3 of FIGS. 2A and 2B in accordance with embodiments.
Figure 3B:
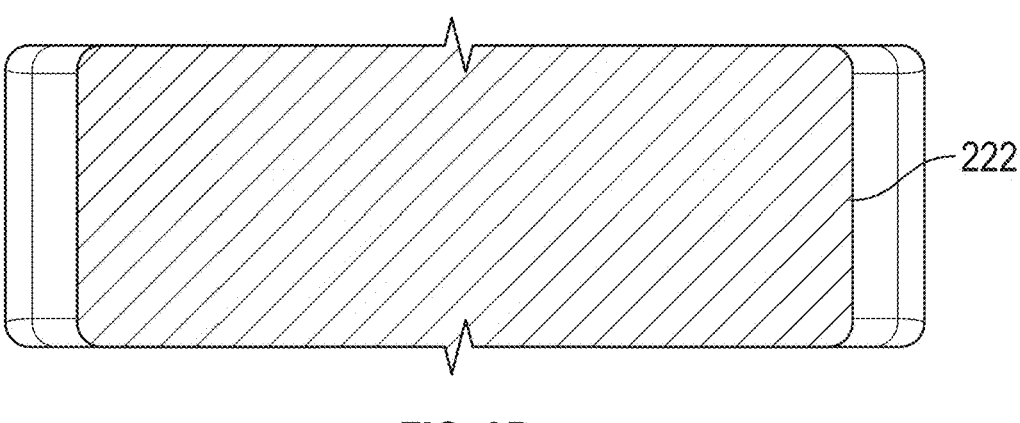
Figure 3C:
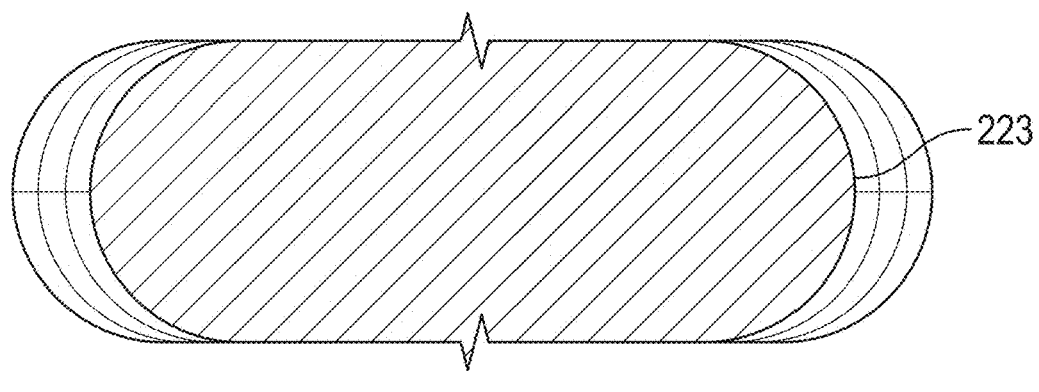

In accordance with embodiments and as shown in FIGS. 3A, 3B and 3C, the duct 220 can have a rectangular cross-section 221 (see FIG. 3A), a rectangular cross-section with rounded corners 222 (see FIG. 3B) and an ovoid cross-section 223 (see FIG. 3C). It is to be understood, however, that the duct 220 can have other shapes and configurations and that those listed herein are merely exemplary.

The inlet portion 210 can be, but is not required to be, generally annular in shape and has a first circumferential side 211 and a second circumferential side 212 opposite the first circumferential side 211. The first plenum 241 is arranged around the first circumferential side 211 of the inlet portion 210 and the second plenum 242 is arranged around the second circumferential side 212 of the inlet portion 210 such that the first and second plenums 241 and 242 are disposed on opposite circumferential sides of the inlet portion 210. The first plenum 241 includes an outer surface 2410 with an increasing radius of curvature and the second plenum 242 includes an outer surface 2420 with an increasing radius of curvature.

In accordance with embodiments, the outer surfaces 2410 and 2420 can be parabolic in shape or nearly parabolic in shape.

The flow diverter 250 is disposed aside the inlet portion 210 opposite the duct 220 in a radial dimension. During operation, the first and second plenums 241 and 242 direct flows of air from the duct 220, around an outer side of the inlet portion 210 and around an inner side of the inlet portion 210 and toward the flow diverter 250. That is, air flows propagating through the duct 220 propagate through the first and second plenums 241 and 242 and circumferentially around the inlet portion 210. The flow diverter 250 distributes the air flows uniformly around the circumference of the inlet portion 210. The flow diverter 250 and the first and second plenums 241 and 242 cooperatively encourage the uniform distribution of the air flows, provide adequate radial clearance so the air flows can turn and stabilize the patterns of the air flows.

The flow diverter 250 includes first curvilinear side 251, which tangentially registers with and smoothly leads to the outer surface 2410 of the first plenum 241, and second curvilinear side 252, which tangentially registers with and smoothly leads to the outer surface 2420 of the second plenum 242, and a cusp 253. The cusp 253 is formed where the proximal ends of the first and second curvilinear sides 251 and 252 meet and can be pointed toward the annular compressor inlet 215 and center axis 11 (see FIG. 1).

Figure 2A:
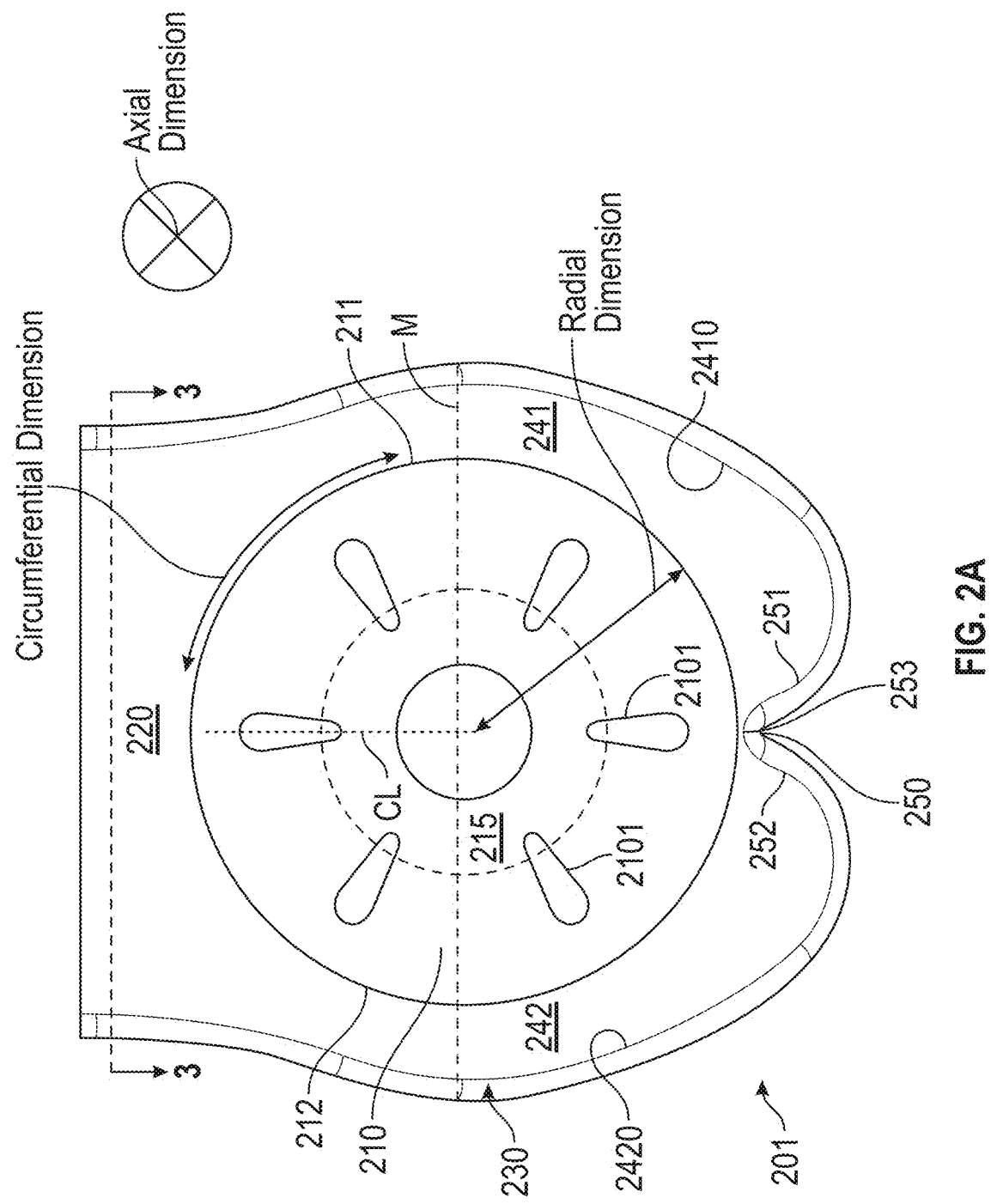
FIGS. 2A and 2B are plan views of a radial inlet of a gas turbine engine compressor with symmetric and asymmetric configurations in accordance with embodiments.
Figure 2B:
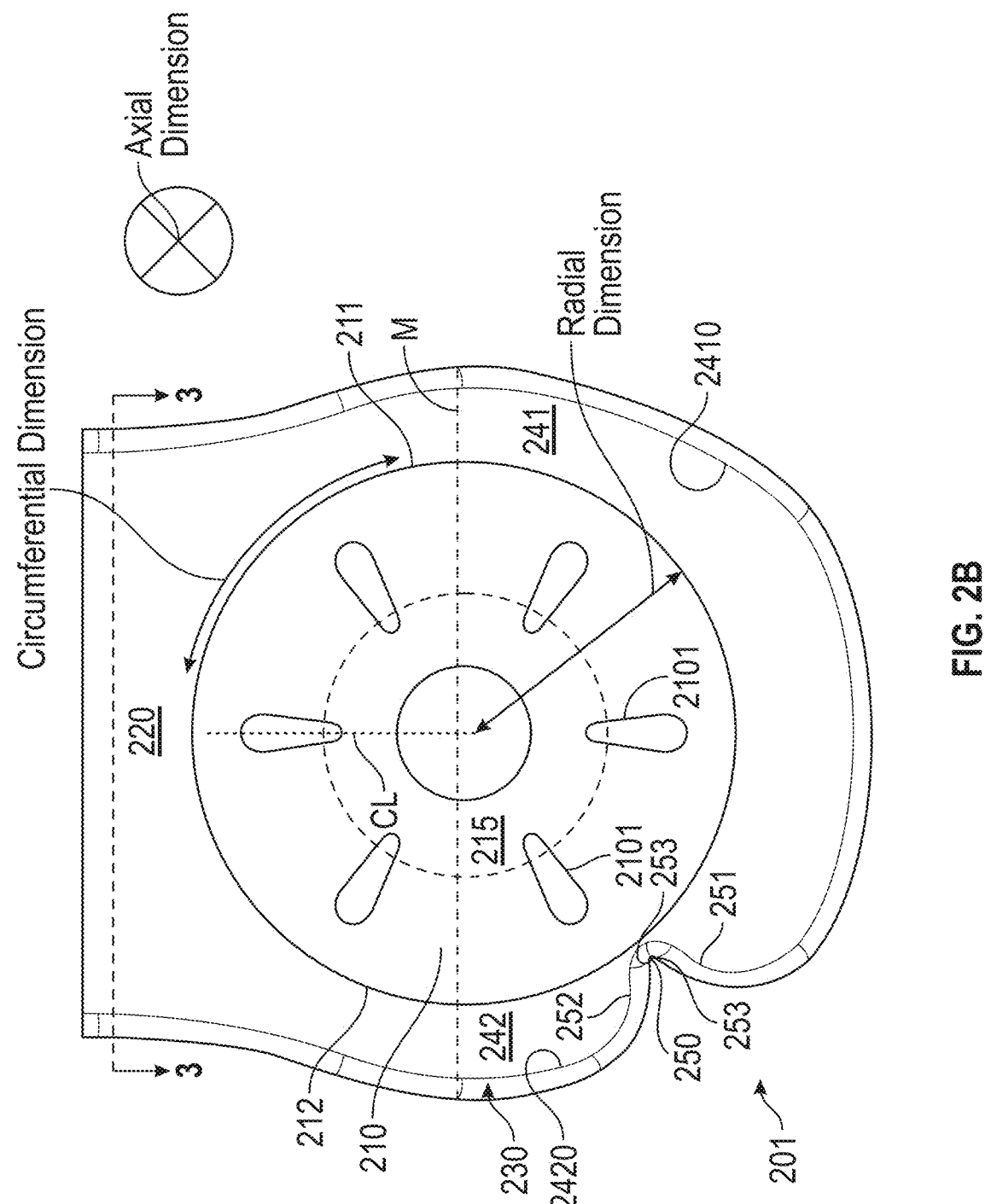

As shown in FIG. 2A, the flow diverter 250 can be aligned with the annular compressor inlet 215 and with a center line CL of the duct 220 and, in these or other cases, the first and second plenums 241 and 242 and the flow diverter 250 can be generally symmetric about the center line CL. Alternatively, as shown in FIG. 2B, the flow diverter 250 can be offset from the center line CL of the duct 220 and, in these or other cases, the first and second plenums 241 and 242 and the flow diverter 250 can be asymmetric at least with respect to or about the center line CL. These and other asymmetries of at least the first and second plenums 241 and 242 and the flow diverter 250, such as those which are not defined with respect to or about the center line CL, can be designed, for example, to counteract biases in inlet flows toward one of the first and second plenums 241 and 242

The tangential registry and the smooth interface of the first curvilinear side 251 with the outer surface 2410 of the first plenum 241 and the tangential registry and the smooth interface of the second curvilinear side 252 with the outer surface 2420 of the second plenum 242 avoids or reduces pressure losses at the flow diverter 250 as the air flows meet and proceed toward the annular compressor inlet 215. In addition, the respective curvatures of the outer surfaces 2410 and 2420 as well as the tangential registry of the first curvilinear side 251 with the outer surface 2410 of the first plenum 241 and the tangential registry of the second curvilinear side 252 with the outer surface 2420 of the second plenum 242 reduce flow separation, noise and losses and thus achieves a more uniform inlet pressure profile and stable flow.

The first and second plenums 241 and 242 generally surround the first and second circumferential sides 211 and 212 of the inlet portion 210 and include the respective outer surfaces 2410 and 2420 with the increasing radii of curvature from about a radial midpoint M of the inlet portion 210 to the flow diverter 250 (i.e., as the air flows proceed radially inwardly, the respective outer surfaces 2410 and 2420 of the first and second plenums 241 and 242 begin to exhibit the increased radii of curvature past the radial midpoint M). In this way, a flow area of the first and second plenums 241 and 242 increases toward the flow diverter 250. As such, to counteract diffusion of the air flows and other reductions of air flow velocities caused by the increased flow area of the first and second plenums 241 and 242, the front and aft sidewalls 261 and 262 restrict the flow area in the axial dimension.

Figures 4, 5:
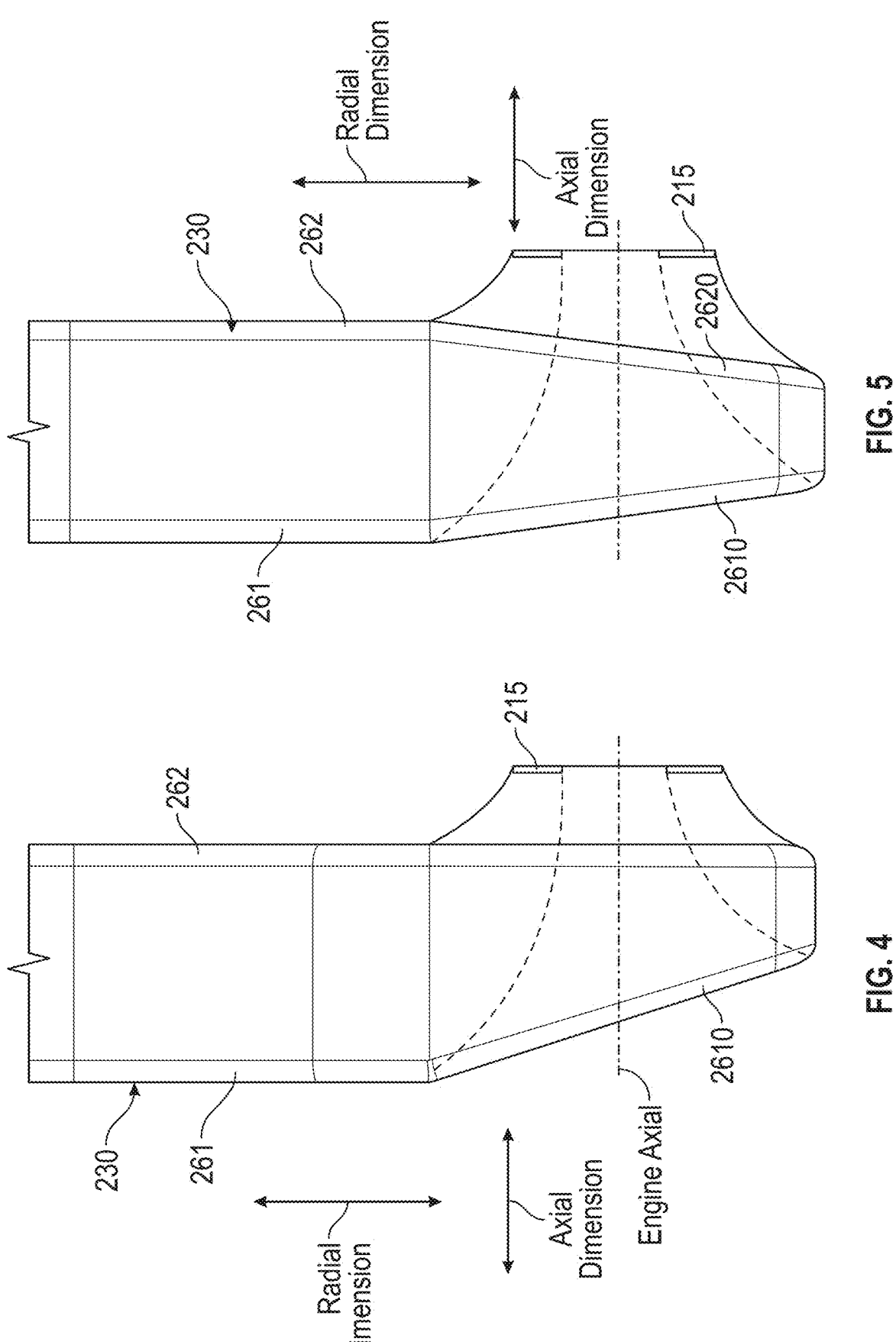
FIG. 4 is a side view of the radial inlet of FIG. 2A in accordance with embodiments.
FIG. 5 is a side view of the radial inlet of FIG. 2A in accordance with embodiments.

The front sidewall 261 supports the inlet portion 210 and faces axially rearwardly. The aft sidewall 262 is opposite the front sidewall 261 and faces axially forwardly. The front and aft sidewalls 261 and 262 are angled toward one another along respective lengths of the first and second plenums 241 and 242 (i.e., along the lengths of the first and second plenums 241 and 242 from the radial midpoint M to the flow diverter 250). As shown in FIG. 4, the aft sidewall 262 can be entirely flat and the front sidewall 261 can include an angled portion 2610 that is angled toward the aft sidewall 262. As shown in FIG. 5, the front sidewall 261 can include the angled portion 2610 and the aft sidewall 262 can include an angled portion 2620 where the angled portions 2610 and 2620 are angled toward one another. In either case, the front and aft sidewalls 261 and 262 restrict the flow area of the first and second plenums 241 and 242 in the inward radial dimension.

Technical effects and benefits of the features described herein are the provision of a radial inlet body of a gas turbine engine compressor with a flow diverter having curvilinear sides forming a cusp, plenums with increasing radii of curvatures and tapered sidewalls that combine to achieve a uniform inlet pressure profile and exhibit avoided or reduced losses.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A radial inlet body of a gas turbine engine compressor, the radial inlet body comprising:
    a flow diverter;
    plenums arranged around opposite sides of an inlet portion defining a compressor inlet, the plenums comprising outer surfaces with increasing radii of curvature exhibiting increasing distance from the inlet portion and decreasing distance to the flow diverter,
    the flow diverter being disposed aside the inlet portion opposite a duct, the plenums being configured to direct flows from the duct around the inlet portion, the flow diverter and the plenums being configured to cooperatively encourage uniform distribution of the flows and the flow diverter comprising:
        curvilinear sides that tangentially register with and smoothly lead to the outer surfaces of the plenums; and
        a cusp where the curvilinear sides meet; and
    a front sidewall supporting the inlet portion and an aft sidewall opposite the front sidewall, the front and aft sidewalls being angled toward one another along the plenums.

2. The radial inlet body according to claim 1, wherein the outer surfaces are parabolic.

3. The radial inlet body according to claim 1, wherein the plenums comprise the outer surfaces with the increasing radii of curvature from a midpoint of the inlet portion to the flow diverter.

4. The radial inlet body according to claim 1, wherein the flow diverter is aligned with a center line of the duct and the plenums and the flow diverter are symmetric about the center line.

5. The radial inlet body according to claim 1, wherein the flow diverter is offset from a center line of the duct and the plenums and the flow diverter are asymmetric.

6. The radial inlet body according to claim 1, wherein the aft sidewall is entirely flat and the front sidewall comprises an angled portion which is angled toward the aft sidewall.

7. The radial inlet body according to claim 1, wherein the front and aft sidewalls each comprise an angled portion angled toward the opposite angled portion.

8. A radial inlet of a gas turbine engine compressor, the radial inlet comprising:
    an inlet portion defining a compressor inlet;
    a duct; and
    a body, comprising:
        a flow diverter;
        plenums arranged around opposite sides of the inlet portion, the plenums comprising outer surfaces with increasing radii of curvature exhibiting increasing distance from the inlet portion and decreasing distance to the flow diverter,
        the flow diverter being disposed aside the inlet portion opposite the duct, the plenums being configured to direct flows from the duct around the inlet portion, the flow diverter and the plenums being configured to cooperatively encourage uniform distribution of the flows and the flow diverter comprising:
            curvilinear sides that tangentially register with and smoothly lead to the outer surfaces of the plenums; and
            a cusp where the curvilinear sides meet; and a front sidewall supporting the inlet portion and an aft sidewall opposite the front sidewall, the front and aft sidewalls being angled toward one another along the plenums.

9. The radial inlet according to claim 8, wherein the outer surfaces are parabolic.

10. The radial inlet according to claim 8, wherein the plenums comprise the outer surfaces with the increasing radii of curvature from a midpoint of the inlet portion to the flow diverter.

11. The radial inlet according to claim 8, wherein the flow diverter is aligned with a center line of the duct and the plenums and the flow diverter are symmetric about the center line.

12. The radial inlet according to claim 8, wherein the flow diverter is offset from a center line of the duct and the plenums and the flow diverter are asymmetric.

13. The radial inlet according to claim 8, wherein the aft sidewall is entirely flat and the front sidewall comprises an angled portion which is angled toward the aft sidewall.

14. The radial inlet according to claim 8, wherein the front and aft sidewalls each comprise an angled portion angled toward the opposite angled portion.

15. A radial inlet of a gas turbine engine compressor, the radial inlet comprising:
    an inlet portion defining a compressor inlet leading to a compressor section;
    a duct by which air is directed from an exterior toward the inlet portion; and
    a body, comprising:
        a flow diverter;
        plenums arranged around opposite sides of the inlet portion, the plenums comprising outer surfaces with increasing radii of curvature exhibiting increasing distance from the inlet portion and decreasing distance to the flow diverter,
        the flow diverter being disposed aside the inlet portion opposite the duct, the plenums being configured to direct flows from the duct around the inlet portion, the flow diverter and the plenums being configured to cooperatively encourage uniform distribution of the flows and the flow diverter comprising:
            curvilinear sides that tangentially register with and smoothly lead to the outer surfaces of the plenums; and
            a cusp where the curvilinear sides meet; and
        a front sidewall supporting the inlet portion and an aft sidewall opposite the front sidewall, the front and aft sidewalls being angled toward one another along the plenums.

16. The radial inlet according to claim 15, wherein the outer surfaces are parabolic.

17. The radial inlet according to claim 15, wherein the plenums comprise the outer surfaces with the increasing radii of curvature from a midpoint of the inlet portion to the flow diverter.

18. The radial inlet according to claim 15, wherein the flow diverter is aligned with a center line of the duct and the plenums and the flow diverter are symmetric about the center line.

19. The radial inlet according to claim 15, wherein the flow diverter is offset from a center line of the duct and the plenums and the flow diverter are asymmetric.

20. The radial inlet according to claim 15, wherein at least one of:

the aft sidewall is entirely flat and the front sidewall comprises an angled portion which is angled toward the aft sidewall, and the front and aft sidewalls each comprise an angled portion angled toward the opposite angled portion.

\* \* \* \* \*